(12) United States Patent
Taylor et al.

(10) Patent No.: US 7,668,144 B2
(45) Date of Patent: Feb. 23, 2010

(54) DYNAMICALLY EXTENSIBLE COMMUNICATIONS DEVICE

(76) Inventors: Rebecca S. Taylor, 707 Terrace Mountain Dr., Austin, TX (US) 78746; Robert D. Sartin, 10412 Ember Glen Dr., Austin, TX (US) 78726

( * ) Notice: Subject to any disclaimer, the term of this patent is extended or adjusted under 35 U.S.C. 154(b) by 914 days.

(21) Appl. No.: 10/162,344

(22) Filed: Jun. 4, 2002

(65) Prior Publication Data

US 2002/0191574 A1    Dec. 19, 2002

Related U.S. Application Data

(60) Provisional application No. 60/294,994, filed on Jun. 4, 2001, provisional application No. 60/309,151, filed on Jul. 31, 2001.

(51) Int. Cl.
*H04W 4/00* (2009.01)
*H04J 3/22* (2006.01)

(52) U.S. Cl. .................. 370/338; 370/465; 709/230

(58) Field of Classification Search .......... 370/328, 370/338, 401, 465, 469; 709/203, 230
See application file for complete search history.

(56) References Cited

U.S. PATENT DOCUMENTS

| | | | |
|---|---|---|---|
| 5,410,675 A | 4/1995 | Shreve et al. | |
| 5,619,650 A | 4/1997 | Bach et al. | |
| 5,666,553 A | 9/1997 | Crozier | |
| 5,680,552 A | 10/1997 | Netravali et al. | |
| 5,708,828 A | 1/1998 | Coleman | |
| 5,768,603 A | 6/1998 | Brown et al. | |
| 5,771,237 A * | 6/1998 | Kao ........................... | 370/463 |
| 5,793,771 A | 8/1998 | Darland et al. | |
| 5,805,832 A | 9/1998 | Brown et al. | |
| 5,845,283 A | 12/1998 | Williams et al. | |
| 5,848,415 A | 12/1998 | Guck | |
| 5,912,897 A | 6/1999 | Steinbach | |
| 5,940,598 A | 8/1999 | Strauss et al. | |
| 5,946,634 A * | 8/1999 | Korpela ..................... | 455/552.1 |
| 5,978,858 A | 11/1999 | Bonola et al. | |
| 5,991,292 A | 11/1999 | Focsaneanu et al. | |
| 6,047,002 A | 4/2000 | Hartmann et al. | |
| 6,111,893 A | 8/2000 | Volftsun et al. | |
| 6,130,917 A * | 10/2000 | Monroe ....................... | 375/295 |
| 6,134,598 A | 10/2000 | Raman | |
| 6,151,390 A * | 11/2000 | Volftsun et al. ............. | 379/229 |
| 6,212,550 B1 | 4/2001 | Segur | |
| 6,278,532 B1 | 8/2001 | Heimendinger et al. | |

(Continued)

FOREIGN PATENT DOCUMENTS

EP    0821507    1/1998

(Continued)

OTHER PUBLICATIONS

U.S. Appl. No. 60/292,524, filed May 23, 2001.*

(Continued)

*Primary Examiner*—Hong Cho
*Assistant Examiner*—Saba Tsegaye

(57) ABSTRACT

This invention discloses a generalized software gateway function which can be housed within small devices and is scalable up to the largest server or other hardware environment which eliminates the differences between devices at the application format, communications protocol and device characteristics layers.

34 Claims, 14 Drawing Sheets

U.S. PATENT DOCUMENTS

| | | | |
|---|---|---|---|
| 6,356,529 | B1 | 3/2002 | Zarom |
| 6,404,775 | B1 | 6/2002 | Leslie et al. |
| 6,405,254 | B1 | 6/2002 | Hadland |
| 6,449,284 | B1 | 9/2002 | Hagirahim |
| 6,487,180 | B1 * | 11/2002 | Borgstahl et al. ............ 370/310 |
| 6,571,308 | B1 * | 5/2003 | Reiss et al. ................. 710/315 |
| 6,594,700 | B1 * | 7/2003 | Graham et al. .............. 709/230 |
| 6,976,080 | B1 * | 12/2005 | Krishnaswamy et al. .... 709/230 |
| 7,072,356 | B1 * | 7/2006 | Clancy et al. ............... 370/465 |
| 7,143,142 | B1 * | 11/2006 | Piersol ....................... 709/217 |
| 2001/0012286 | A1 * | 8/2001 | Huna et al. ................. 370/352 |
| 2001/0039540 | A1 * | 11/2001 | Hofmann et al. ............... 707/3 |
| 2002/0004818 | A1 * | 1/2002 | Lansio et al. ............... 709/203 |
| 2002/0037741 | A1 * | 3/2002 | Tjalldin et al. .............. 455/552 |
| 2004/0148357 | A1 * | 7/2004 | Corrigan et al. ............. 709/206 |
| 2005/0005022 | A1 | 1/2005 | Taylor |
| 2006/0007954 | A1 * | 1/2006 | Agrawal et al. ............. 370/466 |
| 2007/0293221 | A1 * | 12/2007 | Hwang et al. ............. 455/435.1 |

FOREIGN PATENT DOCUMENTS

| | | |
|---|---|---|
| JP | 03-010073 | 1/1991 |
| JP | 04-255136 | 9/1992 |
| JP | 08-070335 | 3/1996 |
| JP | 09-107387 | 4/1997 |
| WO | WO 9828892 | 7/1998 |

OTHER PUBLICATIONS

International Search report PCT/US0003912 mailed Jul. 11, 2000.

* cited by examiner

Generic Communications Gateway Executing on a Mobile Device

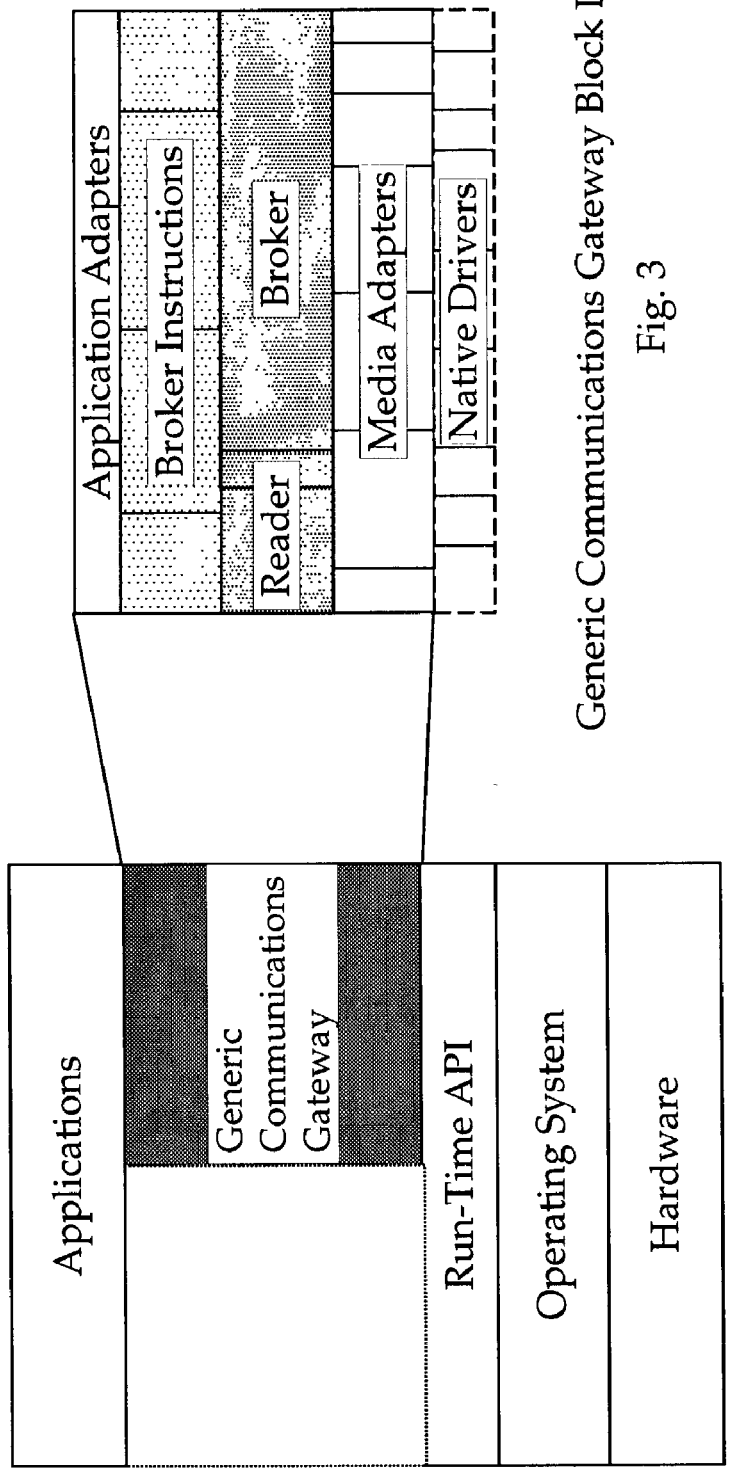

Gateway Instruction Stream Creation Flowchart

Generic Communications Gateway Operational Scenario

Dynamic Gateway Update Flowchart

US 7,668,144 B2

DYNAMICALLY EXTENSIBLE COMMUNICATIONS DEVICE

CROSS REFERENCE TO RELATED APPLICATIONS

This application claims the benefits of the earlier filed U.S. Provisional Application Ser. No. 60/294,994 filed Jun. 4, 2001, which is incorporated by reference for all purposes into this document.

Additionally, this application claims the benefits of the earlier filed U.S. Provisional App. Ser. No. 60/309,151, filed on Jul. 31, 2001, which is incorporated by reference for all purposes into this document.

BACKGROUND OF THE INVENTION

1. Technical Field

The present invention relates generally to flexible data exchange between two or more devices, and, in particular, to an asymmetric, dynamically extensible data exchange software.

2. Background Art

In general, in the descriptions that follow, we will italicize the first occurrence of each special term of art which should be familiar to those skilled in the art of designing software. In addition, when we first introduce a term that we believe to be new or that we will use in a context that we believe to be new, we will bold the term and provide the definition that we intend to apply to that term. This definition will either be immediately following the first use of the term or in the table of definitions at the end of the detailed invention description section. In addition, throughout this description, we may use the terms assert and negate when referring to the rendering of a signal, signal flag, status bit, or similar apparatus into its logically true or logically false state, respectively. For convenience, we will indicate a related triplet of data by bounding the related terms together within "< >" markers.

Additionally, this invention is related to the following co-pending application, U.S. patent application Ser. No. 09/442,683, filed on Feb. 16, 1999, and entitled "Generic Communications Protocol Translator," which is incorporated by reference for all purposes into this document.

BRIEF SUMMARY OF THE INVENTION

This invention is a communications gateway providing asymmetric, dynamically extensible data exchange capability between two or more devices. The gateway eliminates the need for software on the remote end(s) of an N-way computing interface. The gateway provides a robust infrastructure for use by existing computer applications vendors in transmitting their data to and from wireless devices without significant modifications to their existing source code base. The gateway enables dynamic, asymmetric data exchanges so that application or device vendors can send and receive application and protocol-specific data to and from device applications without modification to their internal data structures and/or implementation code. Further, the gateway allows for incorporation of new protocols and data formats as they become available and of interest, rather than requiring their identification and definition at the outset of product development. New device types and application data formats can be rapidly and dynamically incorporated into software developed using the methods described herein. Finally, support for new devices and applications can be more rapidly realized due to the asymmetric nature of the invention: only one peer device is required to have the invention incorporated into it. Examples of these devices include, but are not limited to, smart-phones, handheld computers and personal data assistants, television set-top boxes, high-definition television, automotive accessories such as real-time GPS navigation systems, security system sensors, and pagers. See also devices listed in FIG. 8. A further advantage is that memory utilization is reduced dramatically across the population of devices. Existing application vendors will not have to incorporate direct support for new devices or applications into their implementation code, nor will device vendors have to incorporate support for every other device type and application with which they wish to cooperate.

BRIEF DESCRIPTION OF THE SEVERAL VIEWS OF THE DRAWINGS

Our invention may be more fully understood by a description of certain preferred embodiments in conjunction with the attached drawings in which:

FIG. 2 is a software block diagram detailing the architectural placement of the communications gateway.

FIG. 3 is a block diagram detailing the internal components of the communications gateway itself.

DETAILED DESCRIPTION OF THE INVENTION

Figure 1:
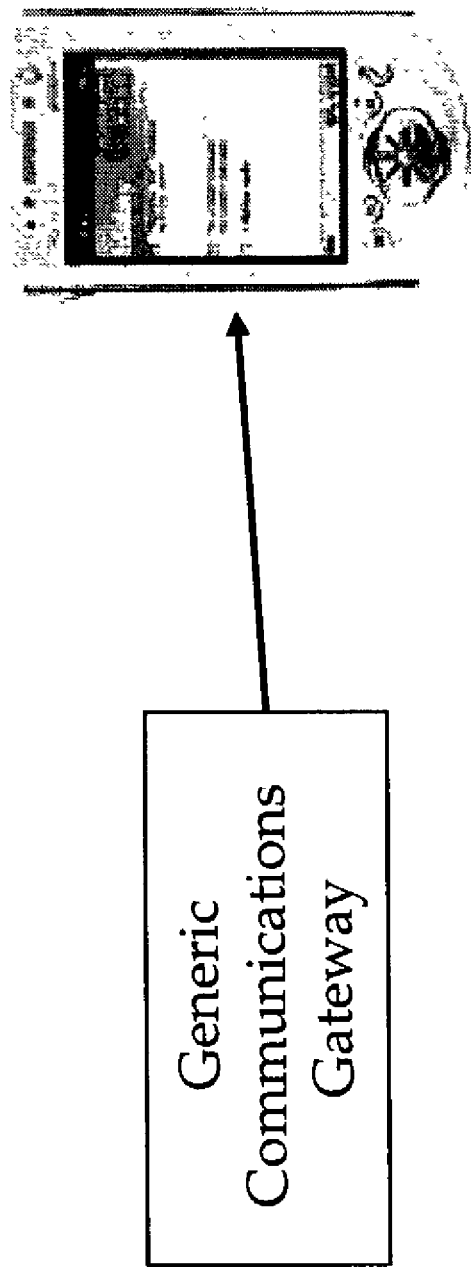
FIG. 1 is a representative device on which the communications gateway may reside.
Figure 4:
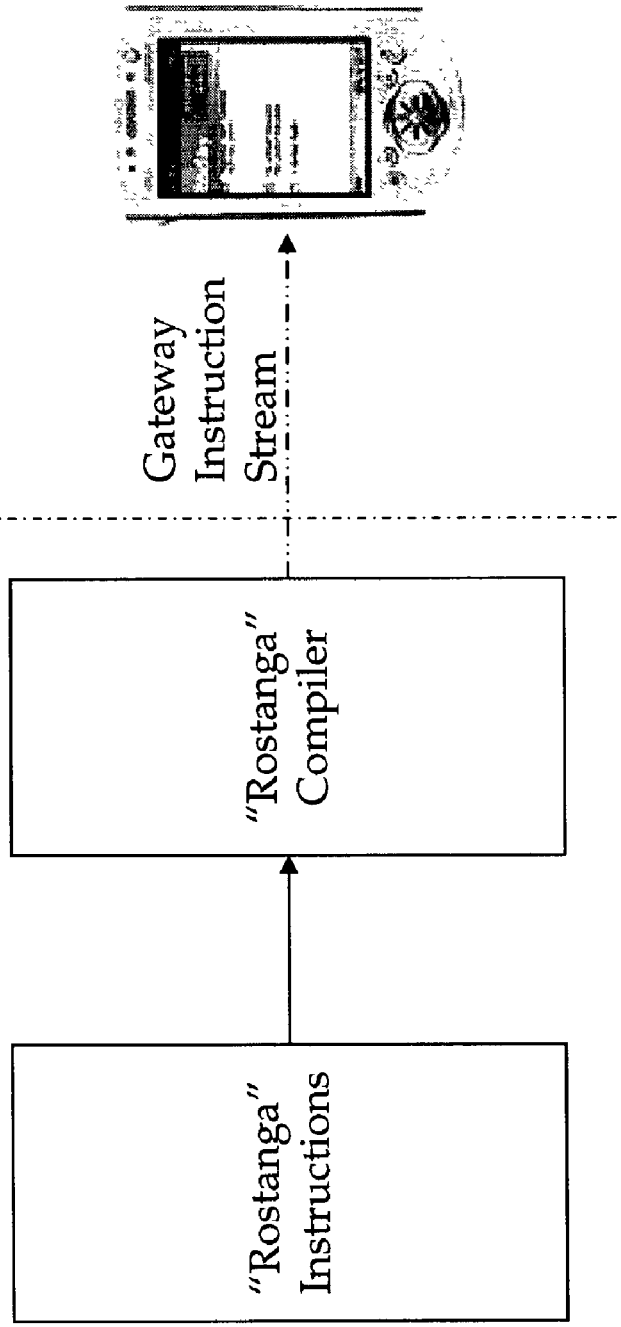
FIG. 4 is a process flow diagram detailing the process by which the gateway receives operational instructions on how to modify a given data stream and facilitate a specific data exchange between two or more devices.
Figure 5:
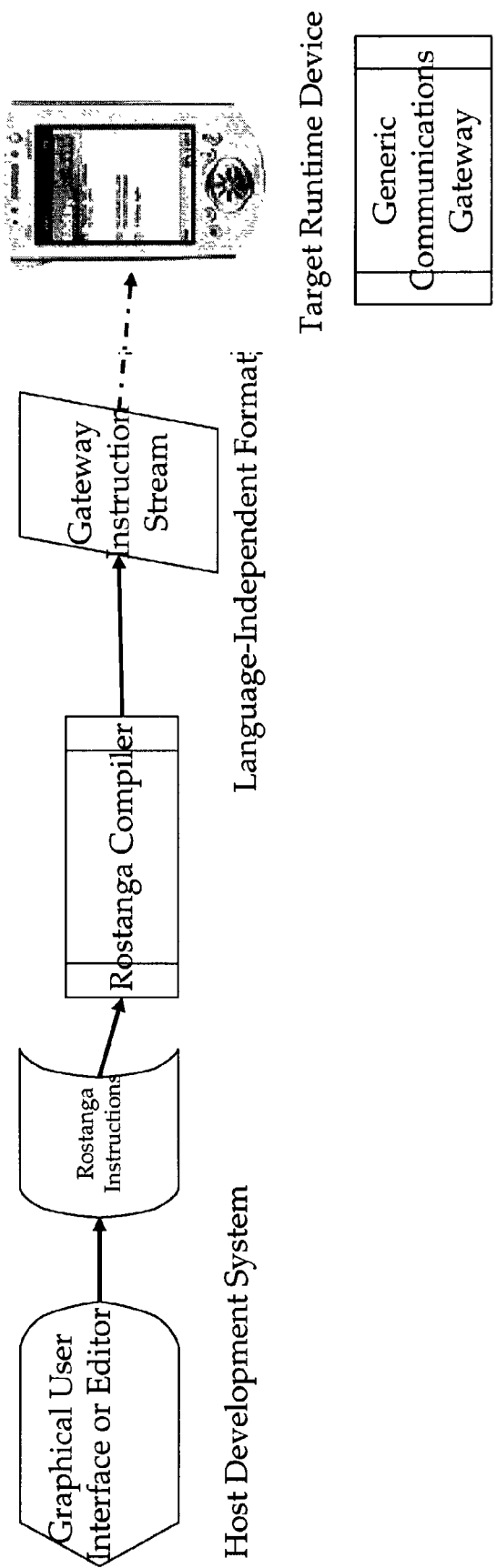
FIG. 5 is a software application flow diagram detailing the sequence of steps a developer goes through to build the communications gateway instructions.
Figure 6:
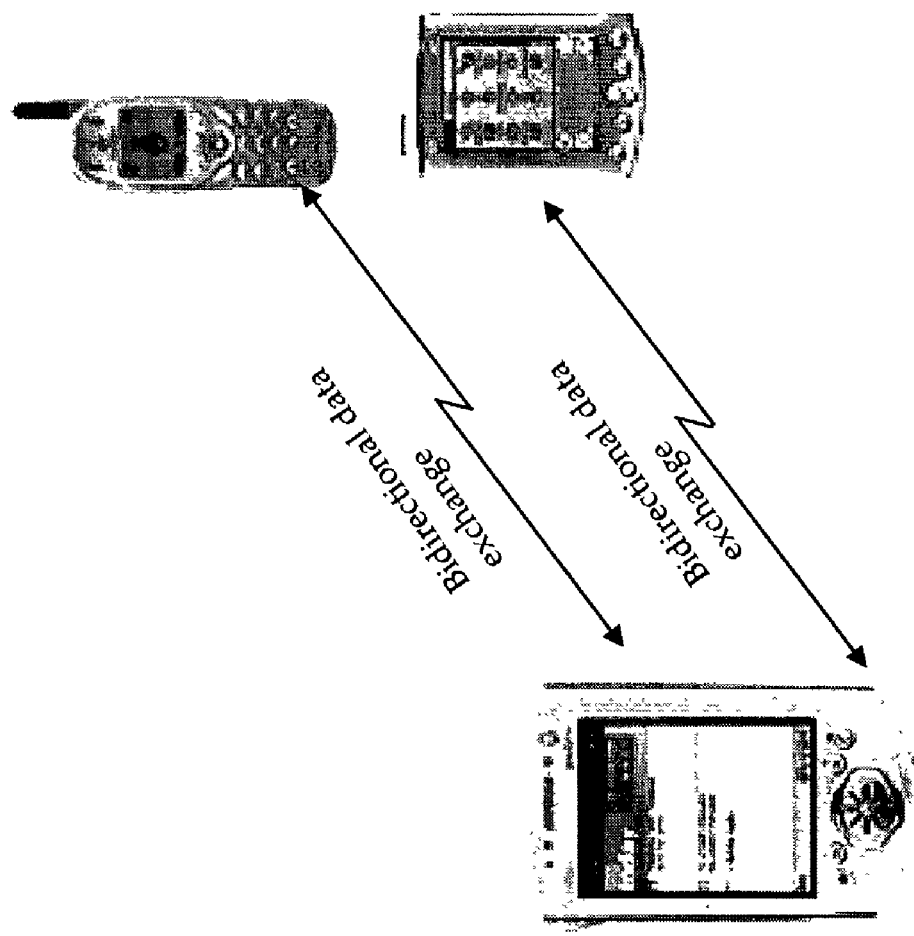
FIG. 6 is a representative operational scenario showing a bi-directional data exchange between three dissimilar devices, with the communications gateway resident on only one of the devices.

One very important side effect of the computing revolution is that there are many ways to store information and numerous options on how to connect two or more computers together. In the early days, one used an RS-232 serial cable. Slow, very reliable, and physically secure were the hallmarks of RS-232, as were distance limitations, slow transfer rates and errors in transmission or reception. Now we use many variants of networking, most of them physically connected via some sort of cable such as RJ-11 or RJ-45. More recently, computing has begun to make use of short range Radio Frequency (RF) communications in order to get rid of the need for any sort of cable whatsoever. Using products based on standards such as 802.11a, b, Bluetooth and soon 802.15, users can get connected to a LAN and to each other much more easily than they could before. There simply are no cables to lose, break or forget.

Similarly, there are many ways to represent the information we all want to move around once we get connected to each other. Database standards such as SQL do the lion's share of the work in storing, modifying and sharing across systems and between applications. There is a very large arena of data which is not managed by SQL: all of the Internet's information is shared using something called HTML. These standards are part of the everyday world of desktop systems, and the mainframe systems which often store the information on behalf of the desktops. They are not part of the everyday world of the mobile and embedded devices which have always been around us, invisibly controlling our airspace, producing our products, regulating our cars, and managing our communications systems. It is this computing realm which we enter when we hold a Personal Digital Assistant (PDA) in our hands, press a cell phone to our ear, or talk to an automated attendant. In these worlds, many different means are used to store data and information, and each realm has different constraints which have resulted in different ways to represent the information we are all storing on our PDAs, in our cellphones, in our cars and in our entertainment systems.

The intersection of all these options for connectivity and the wealth of data format representation approaches has created a situation which is difficult to fix and will get more so as more devices become available which use these options and approaches. To fix this problem requires a very innovative software platform which can recognize the type of device it is trying to connect to, adjust its own capabilities accordingly, and take on the "personality" of the device it is connecting to so that both devices don't have to have matching software in order to connect. We have created such a software platform in order to fix this problem.

The most important result of this invention is a stable infrastructure so that device vendors and applications developers can more easily and cheaply make hardware and software products that work together without continuous and expensive modifications to their product line(s). A major advantage of our approach is that it provides just such an interface and infrastructure. Device and application developers make use of our invention as a service. When our technology is available to their product, they are no longer required to concern themselves with the details of what protocols or application data formats will be used by the devices with which their product will share information. Our solution provides for incorporation of new protocols and data formats as they become available and of interest, rather than requiring their identification and definition at the outset of the product's design.

In solving this problem, we use relatively new concepts and approaches available through modern software languages such as Java and C++. Our approach is also equally valid in any programming language, including assembler, for devices that don't support modern programming languages. We used a robust design technique which forces early consideration and resolution of the class of problem we have solved: that of the permutations, or combinations, of devices, the methods they use to connect to other devices, and the formats they have chosen to represent the data utilized and manipulated by the applications that must collaborate amongst themselves. The design technique we have used is called finite state automata, more commonly known as state machines. State machines are used to describe the sequence of steps required to modify a data stream so that the source format is changed into the format expected by the destination device, before the data stream leaves the sending device. This capability, which we call "asymmetry", means that one device can control whether or not it can connect and collaborate with another device. Until we created our technology, the method used by software developers to get two or more devices to collaborate over a data stream required that all devices which participate in the collaboration must have a piece of software resident on the device to handle the mechanics of both the software connection and exchange of messages as well as software logic to handle changing the format of the data if the source application represents information differently than the receiving application. This approach works well when the number of device types, protocol types and applications is very small, no more than one or two of each. This approach breaks very quickly when the number of device types, protocols, or applications rises above two. It breaks for three reasons: 1) Supporting all possible combinations of device, protocol and application, even for just three of each, would mean 27 different combinations of application format, protocol and device would have to be supported. This further assumes that all protocol stacks work exactly alike, and implement the communications protocol perfectly. This assumption is invalid, so the reality is that more than 27 different combinations actually exist for this example. 2) Typically, developers must focus on making one combination work with exactly one other combination before moving onto the second, third and other combinations. This is for both business and technical reasons. Usually, there is market and cash pressure to get to market quickly with a product. This results in compressed software product development schedules, and a need to "get something working" quickly. The outcome of this situation is that applications come out ready to work with exactly one other application that is well understood, that uses a known and previously agreed protocol, and works between two previously agreed devices. The resultant application thus is "bolted" to an infrastructure that is very specific to a given pair of devices and a specific implementation of a specific protocol. Adding a third device, or a second protocol or a new application to the mix drives the need for a completely new infrastructure, which causes up to 80% of the entire application to be re-written. The upshot for this approach is a new version of the application is written each time one of these three things changes. This creates a new executable image which must be loaded beside the existing executables. This uses up significant amounts of memory and computing resources, both of which are scarce on mobile, embedded and other constrained devices. Despite its limitations, this approach is viable in environments such as desktop and LAN computing, where PCs running a known operating system (e.g. Windows) atop a known networking protocol (e.g. TCP/IP and 802.3 Ethernet). This approach does not work at all in the mobile environment, where devices are constrained, where numerous operating systems exist due to space constraints, and where communications protocols are numerous (e.g. 802.11b, 802.11a, Bluetooth, CDMA, TDMA, proprietary), and where significant turbulence in terms of market entrants and products exists. On average, several dozen new PDAs, cell phones and other handheld "gadgets" are introduced each quarter. Many of these, from 1999-2001, came from vendors that were new to the mobile marketplace. 3. Product development cycles are not synchronized between vendors. This results in different versions of communications protocols being supported by vendors, depending on when the vendor integrates a given standard into its product line. Different versions of application formats, even when defined in a standard, suffer the same "trap" based on timing of product release schedules between two vendors. So, two vendors whose products both support 802.11b may not work well together because they may have incorporated different versions of the standard. Additionally, the same two vendors may also support a formatting standard such as SyncML or vCard for business card exchange. However, their products may not easily exchange information between their applications as one product may support V1.0 of the SyncML spec and the other may be supporting an earlier, beta, or a later, more refined version. This results in garbage being delivered in part or all of the business card.

A simple example illustrates the point. You own a new cellphone, from Nokia, which implements version 1.1 of the Bluetooth communications standard. You also own an iPAQ 3870 PDA which implements 1.0b of the Bluetooth communications standard. These two devices may be able to physically connect and might even successfully exchange a data stream, but if you send a business card, or a photograph, or an audio file between the two devices, the PDA business card format will not be usable by the Nokia phone. Similarly, if you have a video camera which also supports Bluetooth, but implements V2.0 of the Bluetooth spec and expects the other devices to support specific types of graphics standards, the resultant exchange of a video or still image will not be successful—the user will not be able to see or use the image once it is transferred to the PDA or the cellphone. Specific examples and scenarios change over time as vendors rush to fix each pair of broken exchanges, at the device, operating system, protocol and/or application format levels, but the general problem of flexible, reliable data exchange remains.

The following description and set of images describes how our technology works, so that an implementer skilled in the art of software development can build a similar capability. We move directly into the core of the invention, which is the event handling mechanism. It is this mechanism which makes possible the dynamic, asymmetric capabilities for which this patent has been filed. We then describe how finite state automata are used in our invention as this technique is central to our approach.

The basis of the generic communications gateway architecture is a simple and powerful event-handling model. The generic communications gateway essentially works by stringing together a set of special- and general-purpose event handlers that together form a chain (or, more generally, a connected graph) of, among other things, communication, transport, and translation services that allows disparate devices to interchange data.

Figure 15:
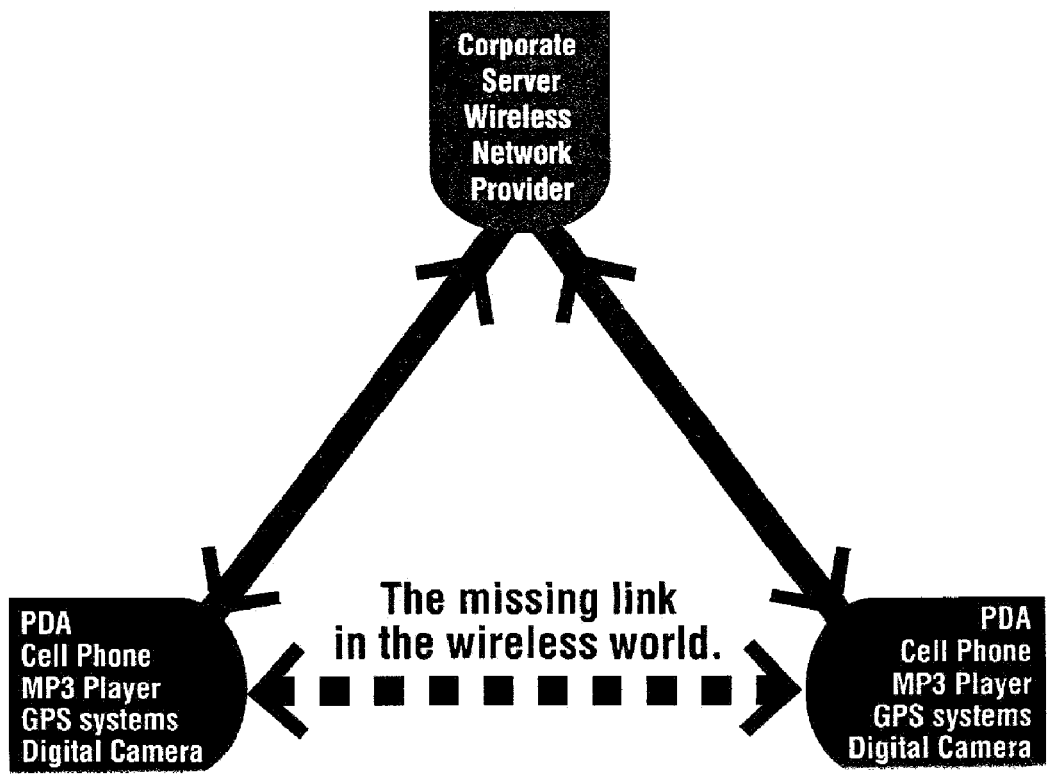
FIG. 15 contrasts direct communication between two mobile wireless devices against communication using an intermediary device or network.

Note that the above examples illustrate direct communication between mobile wireless devices (e.g., cellphone and PDA)—that is, communication that does not involve an intermediary device or network. FIG. 15 contrasts this direct or "peer-to-peer" communication (shown by a dashed line) with communication that involves an intermediary device or network such as a corporate server or wireless network provider. This form of communication may increase end-user productivity and reduce frustration by eliminating the need to make a slow and expensive wireless connection to a content provider or corporate host. This direct communication may be wireless in certain embodiments, including infrared, short-range wireless (e.g, Bluetooth), wireless LAN (e.g., 802.11), etc.

Events and Event Handlers

An event is simply a tuple <event type, key, value> that is dispatched to and handled by an event handler. An event has a type simply as a convenience to allow grouping of events into protocol categories; this makes it more convenient to write code that must determine how to handle events (for example, to ignore all but a certain class of event) by allowing logical switching based on broad event types rather than fine-grained inspection of event keys and values.

A very typical type of event handler is one that accepts events which progressively direct it to store pieces of a data structure, the component pieces of which are contained in separate events, and once the data structure is complete, to send the data structure to some target location. Event handlers also quite typically accept configuration events that can be used to chain them together into arbitrary configurations and to initialize data structures needed for subsequent processing.

So, for example, imagine an event handler the purpose of which is to build up a data structure containing the contact information as might be present on a business card, and which, once all data has been gathered, to send the completed business card to a destination that is described by an address, port number, user id, and password. This event handler could be designed to accept three distinct event types: one type for configuration of the handler with the information describing the destination, one type for internal storage of the component information of the business card, and one type for signaling that all data has been given to the handler and the handler can now send the completed business card to the already-configured destination. A complete set of events that would result in the transport of a business card to a destination might look like the following:

<"config", "address", "231.24.193.27">

<"config", "port", "8087">

<"config", "id", "atlas145">

<"config", "password", "$%tX-0%5hu">

<"data", "name", "Jules Smythe">

<"data", "address", "1122 7th Avenue">

<"data", "phone", "4-223-19715">

<"end-of-data", " ", " ">

To make this example more general, one can imagine separating the gathering and sending aspects of this handler into two more general-purpose event handlers. In that case, one might configure a "transport" event handler with the information necessary to send any data it receives to a particular destination, and configure another event handler to store received data, and upon getting an "end-of-data" event, to send the completed data structure off to the first event handler for transport. Strictly speaking, event handlers do not communicate directly with one another, but schedule events to be dispatched to designated event handlers; in this case, the event handler which builds up the data structure would, upon the "end-of-data" event, create a new event containing an appropriate type and key, and a value which would be the entire data structure, and it would schedule this event to be dispatched to the transport event handler.

To give an idea of the power of this simple idiom, you can imagine general-purpose event-handlers that translate and filter data, handlers that read data from a variety of sources, handlers that create other handlers (for example, "bootstrap" handlers), handlers to categorize and log events to a variety of destinations, generalized transport handlers, etc.

Event handlers for a particular platform can be written in two ways: in native code (Java, C++, etc.), and in the portable and compact Impart-designed Rostanga state machine language, which produces what is termed a Hierarchical State Machine, or HSM. An event handler that needs to access device- and/or operating system-specific services (for example, reading a file from the file system, or interacting with a user through a graphical user interface) must be written with native code. Event handlers written in Rostanga are compact and entirely portable. Rostanga state machine event handlers are also a very natural idiom for capturing communication, discovery, compression, encryption, and structured data parsing logic, to name but a few examples.

Application and Media Adapters

Two other types of native code that bear separate mention are what are termed Application Adapters and Media Adapters. An application adapter serves as the interface from an application to the generic communications gateway. A media adapter serves as an interface between the generic communications gateway and native communication libraries such as sockets, Bluetooth stacks, or 802.11b. Typically, application developers would not be concerned with writing media adapters, as these would be provided along with the generic communications gateway for a particular platform.

Porting the Generic Communications Gateway

When porting to a new platform, the Java version of the generic communications gateway would, in theory, need no rewriting, nor would any native (Java) or Rostanga state machine event handlers, though application and media adapters would likely need porting. For the C++ version of the generic communications gateway, the core generic communications gateway would need porting (largely because event dispatching is highly platform-specific, though entirely transparent), along with any native event handlers, and also application and media adapters, though again, not Rostanga state machines.

The Hierarchical State Machine

A Hierarchical State Machine (abbreviated as HSM) is a generalization of a state machine that allows nesting of states in a hierarchy (a singly-rooted tree) that allows compact expression of complex state machines, abstraction, logic hiding, and other benefits. More information on hierarchical state machines and associated concepts is available in the general literature; the reader is directed to classical computer science texts as a start, should more background be required.

Impart Hierarchical State Machines, expressed in the Rostanga language, are themselves event handlers. An HSM has two basic pieces: a top-level state that may serve as the root of a hierarchy of states; and an object that acts as a state-machine-specific storage, called "memory". In a hierarchical state machine, multiple states, and even multiple branches of states, can be active at a given time.

States and Transitions

Upon receipt of an event, the HSM will direct its top-level state to receive the event. The top-level state then checks its list of transitions to determine how to handle the event. A transition is a tuple of <source state, guard, action, destination state>. Each transition in the state's transition list is evaluated by invoking the guard of each transition, which is passed the event and the state machine memory If the guard returns true, the transition is "enabled", meaning it is a valid transition to take given the current input event. Taking a transition consists of 1) exiting the source state by invoking the exitState( ) method on that state (which will result in a recursive exit of all active children states, if any exist); 2) executing the associated action, and 3) entering the destination state by invoking the enterState( ) method on that state (which will result in a recursive entry of all eligible children states, if any exist). In short, actions are executed in the order: exit, transition, and entry. When a state is entered, it becomes "active". If the top-level state can find no valid transitions with which to process the event, it will then recursively ask its eligible children to process the current event input. For more information on guards and actions, see Impart's SDK documentation, Appendices A and B, respectively.

Primitive, Composite, and Concurrent States

A state with no children is called a "primitive" state. Transitions for a primitive state will either have a null destination state (in which case the transition is called a "reaction", as no state transition will occur) or a destination state that is the primitive state itself (in which case the transition is called a "self-transition"). A self-transition differs from a reaction in that a reaction does not involve invocation of the exitState/enterState methods.

A state with one or more children, only one of which may be active, is called a "composite" state. A composite state designates exactly one of its children as its initial state, which is the only state among the children that is initially "eligible" for entry and for event processing. Upon entry of a composite state, the entry action is invoked and the initial state is entered, continuing downward in the tree until a leaf node (primitive state) is found and entered last.

As do composite states, a concurrent state has one or more children states. However, unlike a composite state, each child state of a concurrent state is active. Since each child of a concurrent state is active, there are no transitions between children states of a concurrent state. Therefore, each time an event is processed by a concurrent state, all immediate children of the concurrent state are then directed to process the event in "parallel".

AN EXAMPLE

Figure 10:
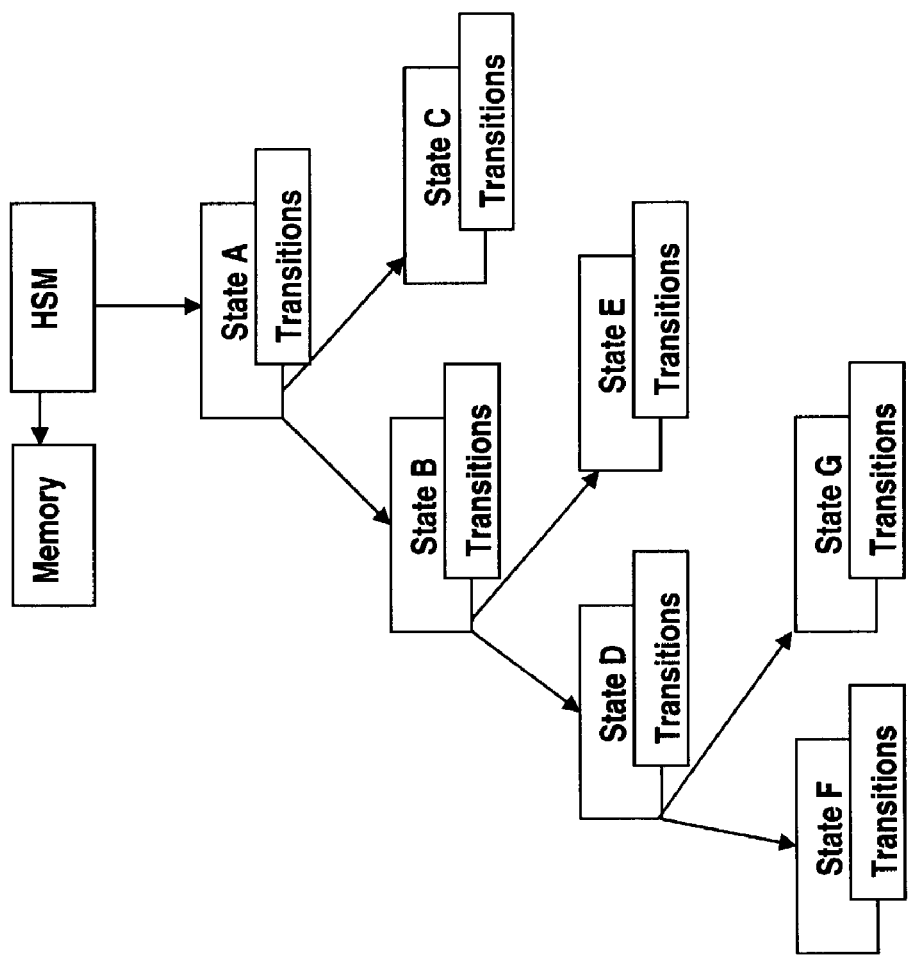
FIGS. 10 through 14 describe state machines in conjunction with a specific example of their use in the communications gateway, to aid a developer skilled in the art to understand how to build the communications gateway.

Consider FIG. 10, which is of a just-constructed hierarchical state machine that has 7 states, labeled A through G. The diagram represents the logical relationship of states, with states A, B, and D being composite states, and states C, E, F, and G being primitive states (we will cover concurrent states in the next example).

When the HSM is built, the machine is activated by entering the top state; in this case, state A. Since state A is a composite state, it has a designated initial state, as do states B and D. Suppose the initial state for A is state B, that for state B is state D, and that for state D is state G. Then, upon entering state A, it will enter state B, which will enter state D, which will finally enter state G. At each entry to the state, the enterState( ) method is invoked.

Figure 11:
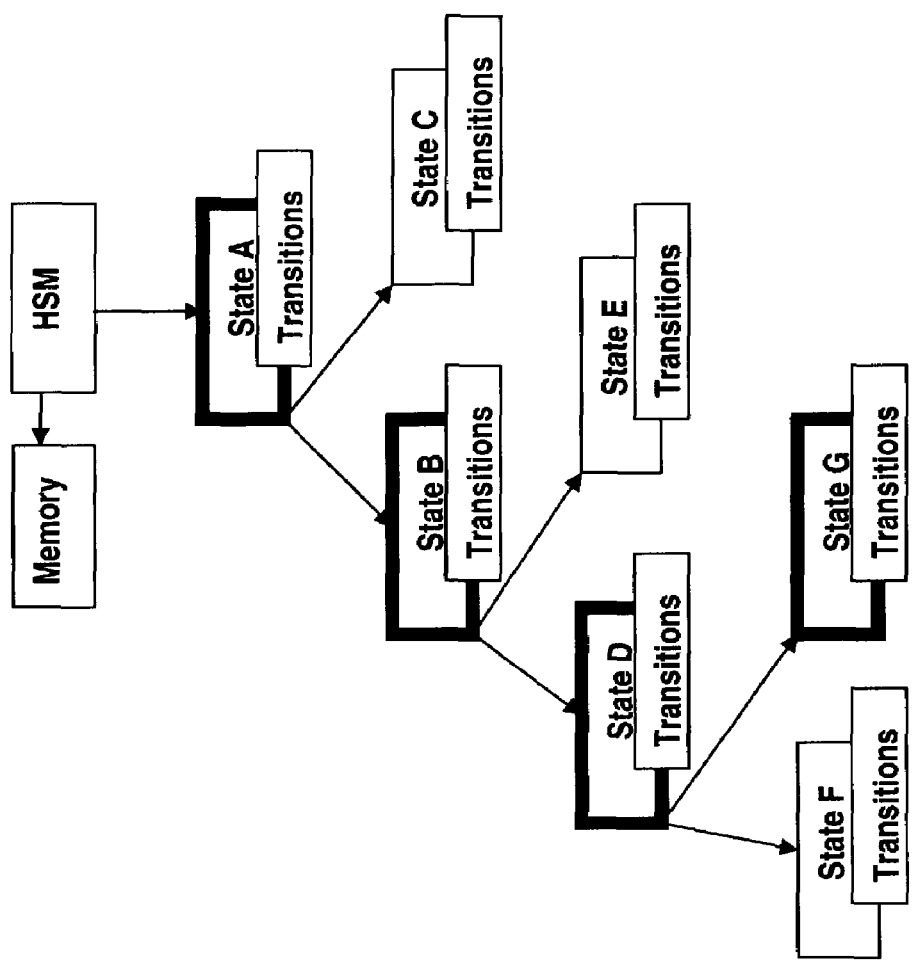

After the machine has been activated, FIG. 11 shows the state machine, in which active states are shown with bold boxes around them. Using a form of dotted address notation, you could say that the HSM is in state "A.B.D.G".

Figure 12:
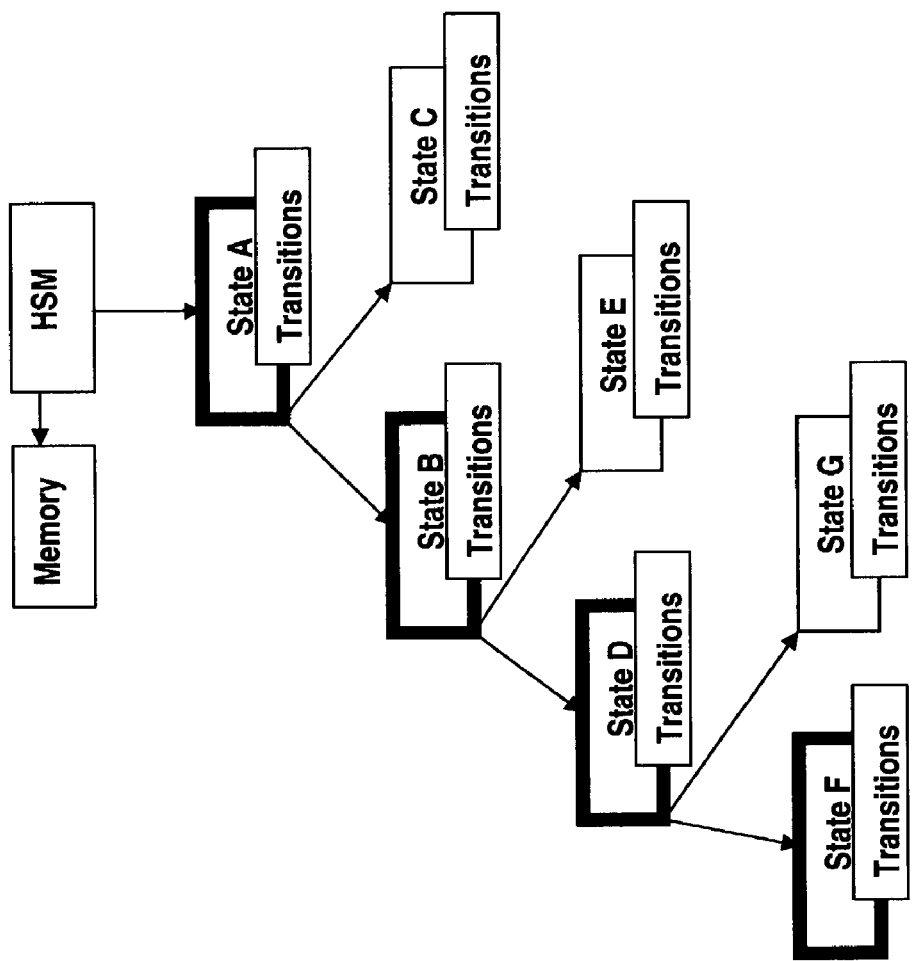

When an event is handled by the HSM, it hands off the event to the top-level state, state A. It also passes along the state machine memory for storage and retrieval of state variables. State A will check its list of transitions to see if any are enabled. Let's suppose that none are, in which case state A will then pass the event (and memory) to its active child state, in this case, state B. Again, let's suppose there is no enabled transition, so state B passes the event and memory along to its active child, state D. At this point, suppose state D finds an enabled transition that calls for a change of state from state G to state F. In this case, state G is exited by calling the exitState( ) method for state G. Then, the action associated with the transition is invoked and given the event and memory in order to process the event. Finally, state F is entered, and its enterState( ) method is invoked, which, among other things, will mark the state as active. FIG. 12 depicts what the state diagram looks like following this transition.

Using a dotted address notation, the state machine is now in state "A.B.D.F". Notice that transitions between states must occur in non leaf-node states, i.e., non-primitive states. State G, a primitive state, knows nothing about its sibling state, state F, and so the transition information must be stored above, in state D. Similarly, a composite state can have a transition only among its immediate children. So, for example, state B cannot contain a transition between states G and F, only between states D and E. To make this example more concrete, consider the event handler described earlier, which accepts a data structure and progressively stores pieces of it, until it receives the last bit of information and sends it off to the appropriate destination. Suppose that in FIG. 12, state C is the transport state that will send the completed data structure off to some destination. Suppose state E is responsible for parsing and storing an address, state G for parsing and storing a phone number, and state F for parsing and storing an e-mail address.

States A, B, D, and F, being composite states, would inspect the incoming event and pass the event to the appropriate data structure handler. Configuration events would be handed to state C by the top-level state. So, let's walk through the receipt of the events listed at the beginning of this example. All configuration events would first be handled by state A. Its transition list would include a transition of the form:

<source=A, guard, null, destination=C>

Here, the source state is A, the guard will return true if the event is of type "config", the action would be null, and the destination state is state C.

State C would be entered and handed the event to process. State C would contain a transition (a self-transition), the guard of which would check the event key as being one of "address", "port", "id", or "password". If the event does not have one of these keys, it might simply discard the event or report an error. The value of these configuration events would be retrieved from the event using a standard value getter. The data would be stored in the HSM memory for later use.

When data arrives, it is funneled down through the state hierarchy for handling by the leaf nodes by the composite states. Upon receipt of the end-of-data event type, state A would pass this along to state C for transport to the pre-configured destination.

A CONCURRENT STATE EXAMPLE

Figure 13:
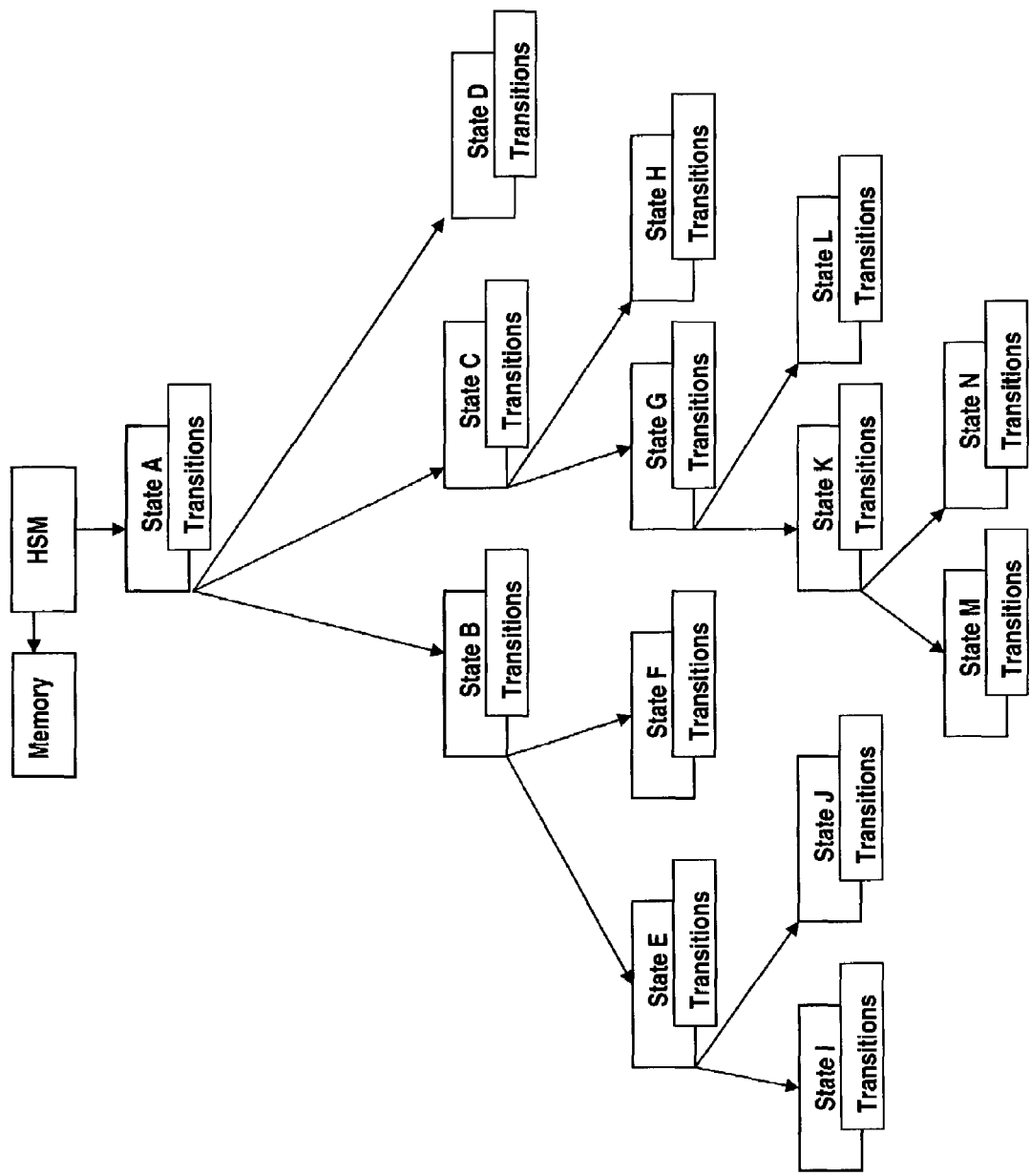
Figure 14:
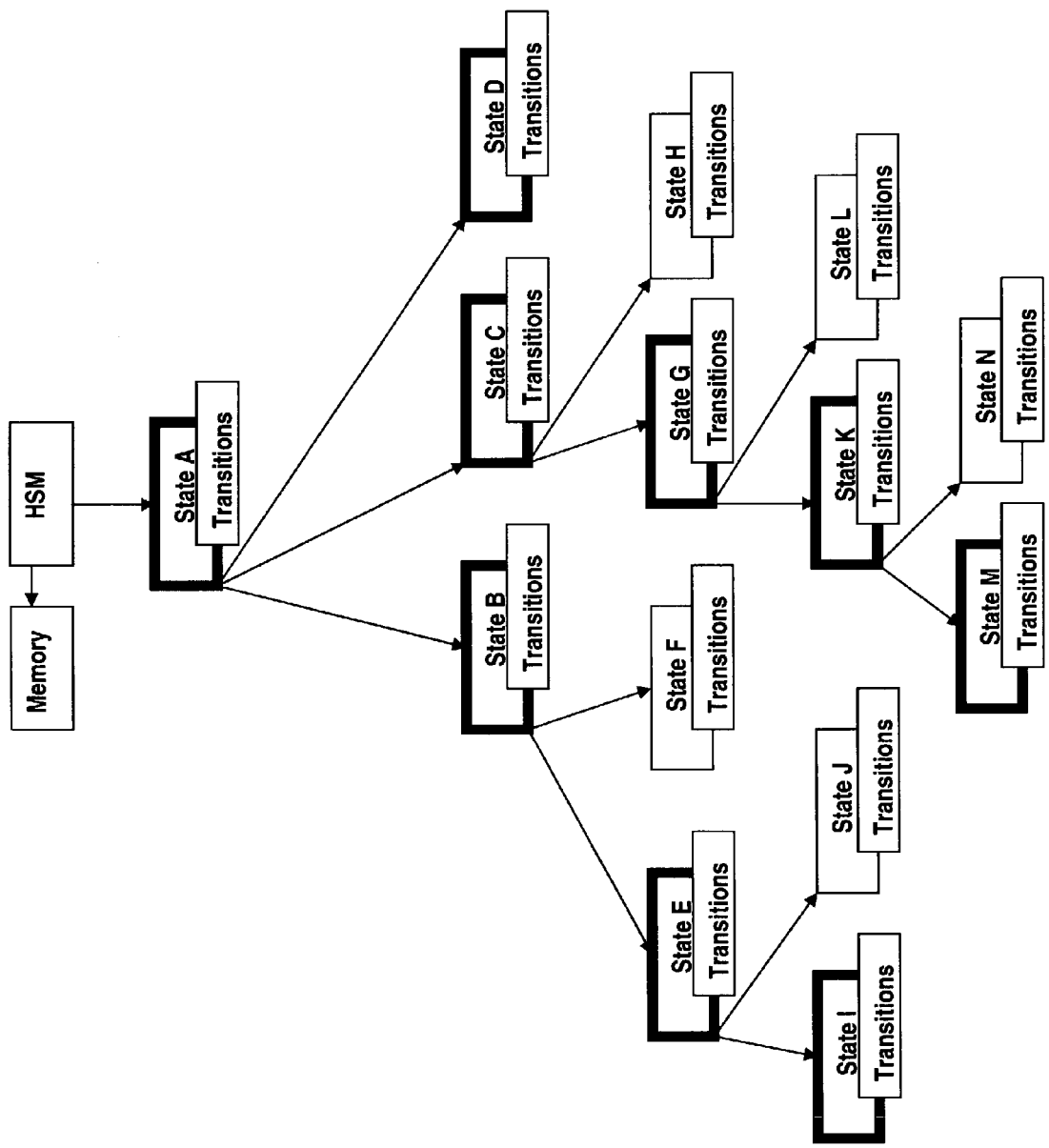

Consider now FIG. 13 showing a just-constructed state machine, which has 14 states, A through N. Let's assume that state A is a concurrent state, and states B, C, E, G, and K are composite, and states D, F, H, I, J, L, M, and N are primitive states. Let's assume that the initial states for the composite state B is E, that for C is G, that for E is I, that for G is K, and that for K is M. Since the top-level state, state A, is a concurrent state, it does not have an initial state designated. Rather, all its children states will be entered when state A is entered, that is, all children of A are always active. So, let's assume the state machine enters state A. FIG. 14 depicts how the state machine diagram would appear.

Again, using a dotted address notation, the state machine is now in states "A,B,E,I", "A,C,G,K,M", and "A,D".

Upon receiving an event to handle, the HSM will pass the event to its top state, A, for handling. Since A is a concurrent state (the only one in this state machine), instead of handing its event to its only active child, as would a composite state, it hands the event (and state machine memory) to each of its three children states, B, C, and D. They in turn process the event as described above.

The utility of a concurrent state is that it allows parallel processing of events. One very direct example of the use of this is to imagine that state D is a state which logs each event it receives to some sort of device, thus providing a record of all events handled by the HSM.

| Definitions | |
|---|---|
| Action | |
| Guard | |
| Rostanga | A language-independent mechanism for expressing state machine behavior, available for use by developers of state machines which are executable by developers of a generic communications protocol gateway. |
| standard value getter | A mechanism for retrieving a particular value out of a data stream. Described in detail in the Impart SDK documentation. |

Dynamic Updating of Communication Device

Figure 7:
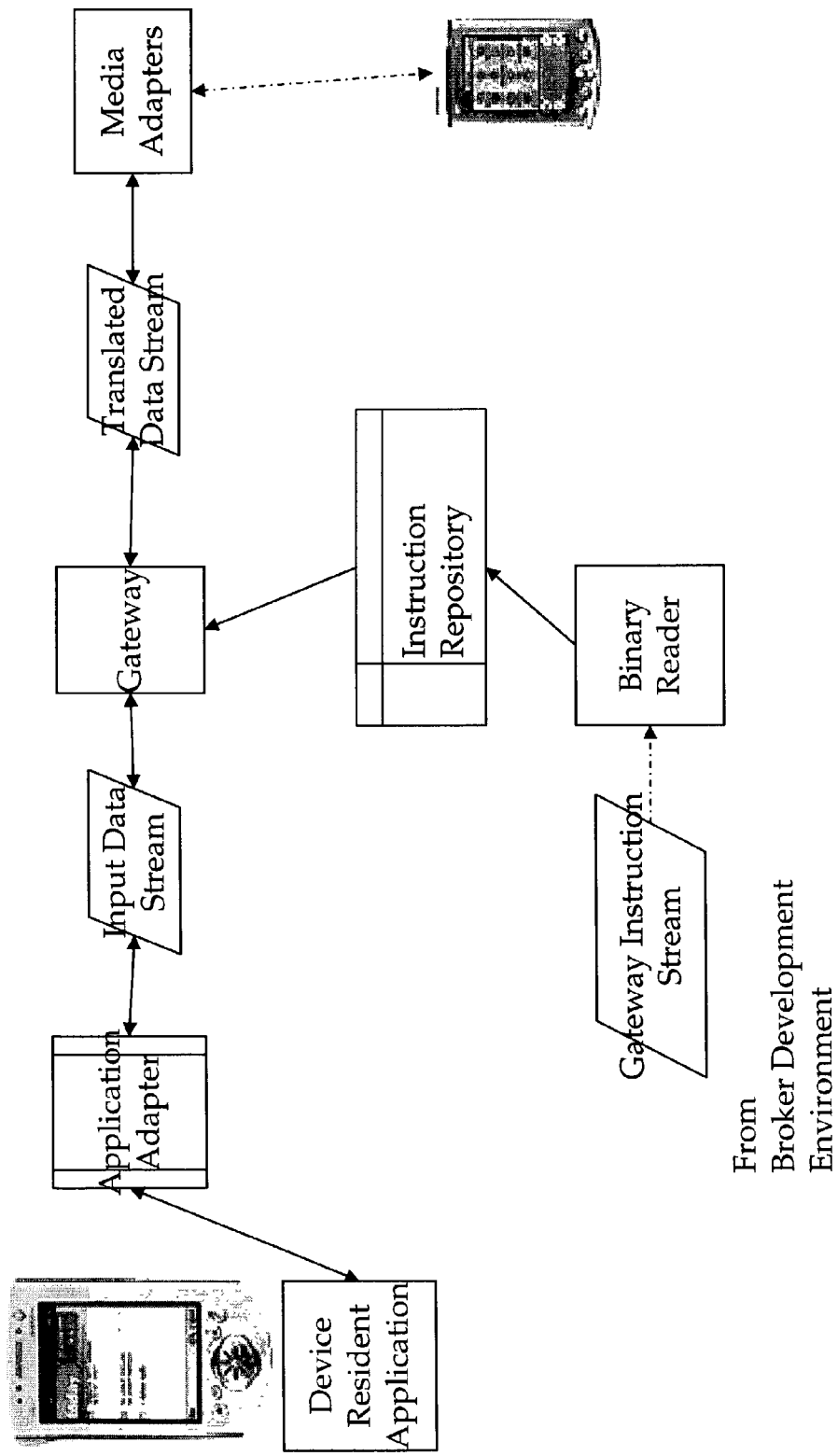
FIG. 7 is a process flowchart describing how the communications gateway dynamically updates itself to allow communications with a previously unknown device.
Figure 8:
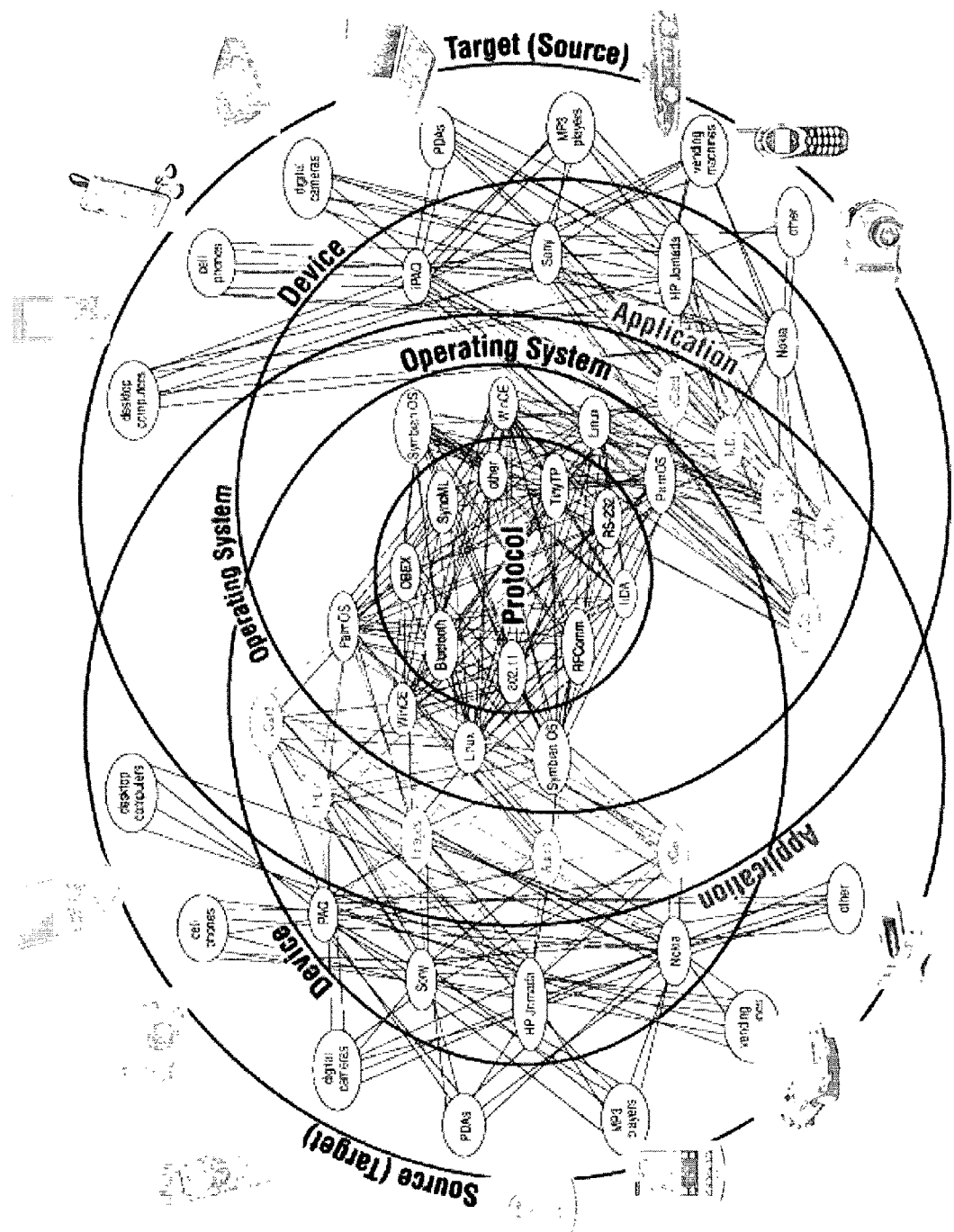
FIG. 8 is a high level description of the four types of differences which impede easy data exchange between dissimilar devices.
Figure 9:
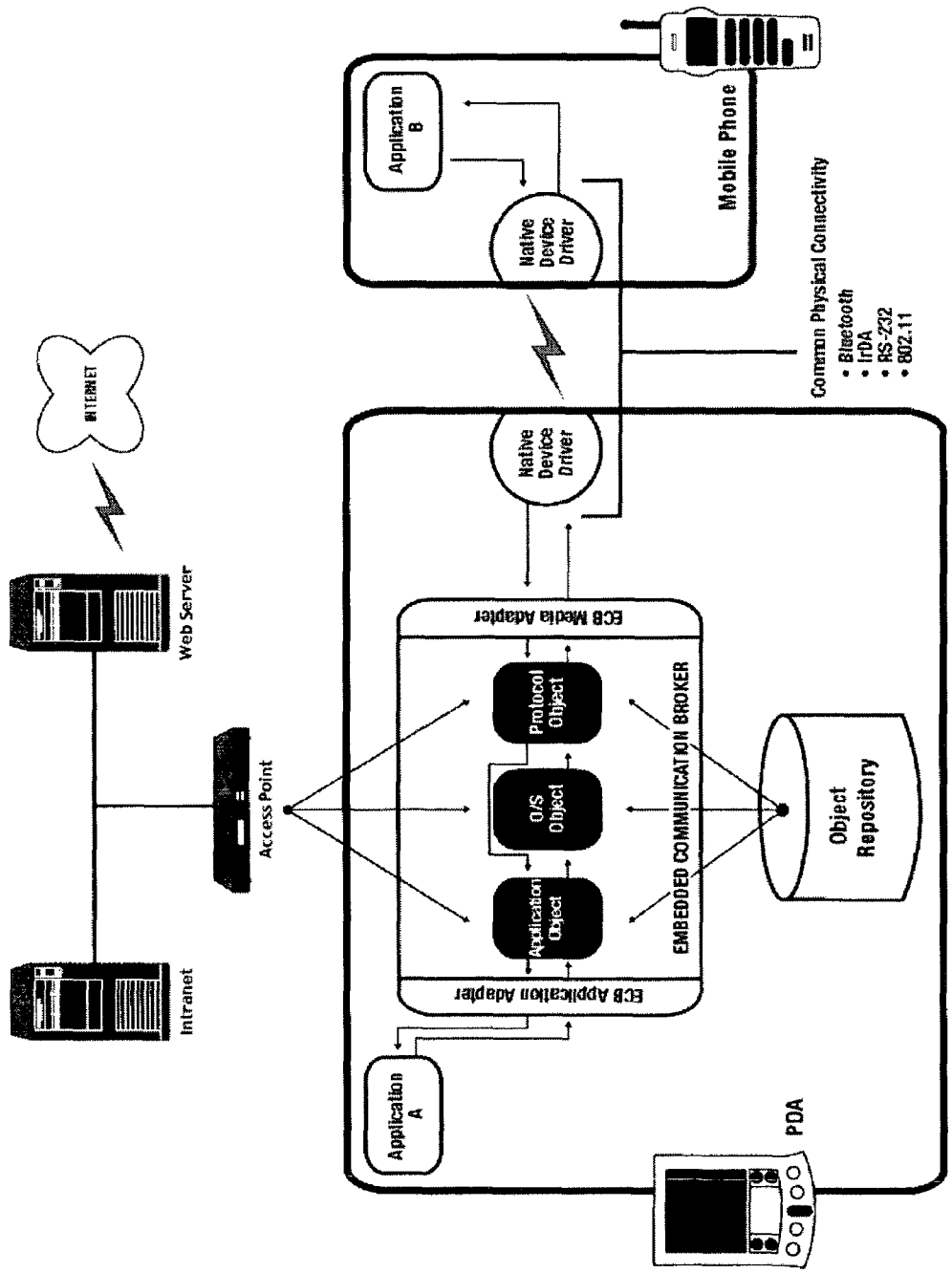
FIG. 9 is a block diagram detailing how the communications gateway dynamically updates itself with new instructions upon encountering a previously unknown device.

One limitation of prior systems that attempt to provide data conversion functionality (format/communication protocol, etc.) is that such systems are constrained by information currently stored in system memory, which is typically not easily updatable (if updating is possible at all). Such constraints are particularly evident in portable devices that have relatively smaller memory footprints to store information that facilitates data conversion (e.g., information to implement an HSM as described above to perform data format/communication protocol conversion). A device according to the present disclosure, however, can be dynamically updated. For example, FIG. 9 shows a representative device (a PDA) that is attempting to directly communicate with another representative, previously unknown device (a mobile phone). Software in the PDA in FIG. 9 is shown as being wirelessly coupled to an external device (here, an access point) that is in turn coupled to one or more additional devices (e.g., a computer system such a web server) via one or more computer networks (e.g., an Intranet, the Internet). One or more of such external devices can constitute an additional "instruction repository" (see, e.g., FIG. 7) that stores new instructions that can be supplied to devices such as FIG. 9's PDA upon request (e.g., upon detecting a device that the gateway cannot currently communicate with). These instructions can be used to dynamically update software on the PDA to include support for the newly-encountered device. Such instructions may thus be downloaded, for example, to update a state machine or other software construct used to effectuate communication between peer devices. The ability to dynamically update a first communication device in this manner may greatly increase the number/type of other devices with the first device may meaningfully interact.

We claim:

1. A first computing device, comprising:
 a processor unit;
 a memory system, wherein the memory system has stored therein a first set of data and wherein the memory system has stored therein program instructions that, if executed by the first computing device, cause the first computing device to perform a method comprising:
 detecting via wireless communication a second computing device that recognizes one or more data formats for communicating with external devices, wherein the first set of data is usable by the first computing device to convert information within the first computing device into a first plurality of data formats for transmission external to the first computing device, and wherein none of the one or more data formats recognized by the second computing device are within the first plurality of data formats;

in response to detecting the second computing device:
automatically retrieving a second set of data from an external system via wireless communication; and
automatically updating the first set of data stored in the memory system to include the retrieved second set of data;

using the updated first set of data, converting data stored by the first computing device to one of the one or more data formats recognized by the second computing device; and directly communicating the converted data to the second computing device wirelessly;

wherein the first computing device and the second computing device are each mobile wireless devices; and wherein the second computing device and the external system are different from one another.

2. The first computing device of claim 1, wherein the first computing device is a mobile phone.

3. The first computing device of claim 1, wherein the first computing device is a personal digital assistant.

4. The first computing device of claim 1, wherein the first computing device is a portable digital music player.

5. The first computing device of claim 1, wherein the memory system has stored therein a first representation of personal contact information for a user of the first computing device, and wherein the first computing device is configured to use the updated first set of data to convert the first representation of the personal contact information to a second representation of the personal contact information that is in one of the one or more data formats that is recognized by the second computing device, enabling direct communication of the personal contact information from the first computing device to the second computing device.

6. The first computing device of claim 1, wherein the first set of data is usable by the first computing device to perform direct communication with a third computing device without automatically retrieving data from the external system.

7. The first computing device of claim 1, wherein the direct wireless communication uses an infrared communication protocol.

8. The first computing device of claim 1, wherein the direct wireless communication uses a short-range wireless communication protocol.

9. A first computing device, comprising:
an external wireless communication interface;
memory having stored therein a first set of data usable to convert information within the first computing device into a first plurality of data formats for transmission via the external wireless communication interface;
a logic unit configured to detect a second computing device that recognizes one or more data formats, none of which are within the first plurality of data formats, and wherein, in response to determining that the second computing device's one or more data formats are not within the first plurality of data formats, the logic unit is configured to:
automatically retrieve a second set of data from an external system via wireless communication, wherein the second set of data is usable by the first computing device to convert information within the first computing device to one of the one or more data formats recognized by the second computing device; and
automatically update the first set of data to include the second set of data;

wherein the logic unit is further configured to use the updated first set of data to directly communicate with the second computing device via the external wireless communication interface;

wherein the first computing device and the second computing device are each mobile wireless devices; and wherein the second computing device and the external system are different from one another.

10. The first computing device of claim 9, wherein the first set of data stored in the memory is usable to allow the first computing device to directly communicate with a third computing device without automatically retrieving data from the external system, wherein the third computing device recognizes at least one data format within the first plurality of data formats.

11. The first computing device of claim 9, wherein the first and second computing devices are mobile phones.

12. The first computing device of claim 9, wherein the second set of data is also usable to update the first computing device to transmit information within the first computing device according to a communication protocol recognized by the second computing device and not previously supported by the first computing device.

13. A method, comprising:
at a first point in time, a first computing device detecting a second computing device, wherein the second computing device recognizes one or more data formats for transmitting and receiving data, and wherein the first computing device is not configured, at the first point in time, to generate output data using any of the one or more data formats;

in response to said detecting, the first computing device automatically retrieving data from an external source via wireless communication;

the first computing device using the automatically retrieved data to generate output data in at least one of the one or more data formats recognized by the second computing device;

the first computing device performing directly wireless communication of the generated output data with the second computing device;

wherein the first computing device and the second computing device are each mobile wireless devices; and wherein the second computing device and the external source are different from one another.

14. The method of claim 13, further comprising:
at a second point in time, the first computing device detecting a third computing device, wherein the third computing device recognizes at least a first data format for transmitting and receiving data, wherein the first computing device is configured, at the second point in time, to generate the output data in the first data format; and
the first computing device subsequently performing directly wireless communication with the third computing device using the first data format.

15. A system, comprising
a first computing device storing a first set of data usable to convert data within the first computing device into a first plurality of data formats for transmission external to the first computing device;

a second computing device configured to transmit and receive data according to one or more data formats, none of which are within the first plurality of data formats;

a storage system storing a second set of data usable to facilitate the first computing device converting data into at least one of the one or more data formats, when the storage system is remote from the first computer system;

wherein the first computing device, upon determining that none of the one or more data formats of the second computing device are within the first set of data, is configured to automatically retrieve the second set of data from the remote storage system via wireless communication and use the second set of data to directly communicate with the second computing device wirelessly using at least one of the one or more data formats of the second computing device;

wherein the first computing device and the second computing device are each mobile wireless devices that are configured to receive input from respective users; and wherein the second computing device and the storage system are different from one another.

16. The system of claim 15, wherein the first computing device is a mobile phone.

17. The system of claim 16, wherein the second computing device is a mobile phone.

18. A first computing device, comprising:
a processor;
a memory having stored therein:
  a first set of data;
  program instructions executable by the first computing device to:
    detect a second computing device;
    determine that the first set of data does not currently include information for generating a data stream that is usable by the second computing device;
    in response to the determination, automatically retrieve information from an external source via wireless communication and use the retrieved information to update the first set of data;
    generating a data stream using the updated first set of data, wherein the generated data stream is usable by the second computing device;
    directly transmit the generated data stream to the second computing device wirelessly;
  wherein the first computing device and the second computing device are each mobile wireless devices that are configured to receive input from respective users; and
  wherein the second computing device and the external source are different from one another.

19. The first computing device of claim 18, wherein the program instructions are executable by the first computing device to use the updated first set of data is to convert data stored in the first computing device from a first data format to a second data format.

20. The first computing device of claim 18, wherein the first and second computing devices are mobile phones.

21. The first computing device of claim 20, wherein generation of the data stream includes data format and data protocol conversions.

22. The first computing device of claim 20, wherein the data stream transmitted by the first computing device to the second computing device includes a still image or video that is viewable on the second computing device.

23. A method, comprising:
a first computing device detecting a second computing device using peer-to-peer communication, wherein the first computing device is currently unable to exchange data with the second computing device in a manner in which data transmitted to the second computing device is usable by a user application of the second computing device;

in response to said detecting, the first computing device automatically retrieving information from a source external to the first computing device via wireless communication; and the first computing device generating a data stream using the retrieved information; and the first computing device transmitting the generated data stream wirelessly to the second computing device using peer-to-peer communication, wherein the data stream is transmitted in a format and a manner such that the transmitted data stream is usable by the user application of the second computing device;

wherein the first computing device and the second computing device are each mobile wireless devices; and wherein the second computing device and the external source are different from one another.

24. The method of claim 23, wherein at least one of the first and second computing devices is a mobile phone, and wherein the method is performed without modification of the second computing device.

25. The method of claim 23, wherein generating the data stream includes converting at least one of: an input data format to an output data format; an input data protocol to an output data protocol.

26. An apparatus, comprising:
a wireless interface;
first means for converting data stored in the apparatus into an output data stream and for converting data received by the apparatus into an input data stream;
wherein, in response to detecting a computing device for which the first means is not currently able to generate a compatible data stream, the apparatus is configured to dynamically update, via the wireless interface, the first means and use the updated first means to convert data stored in the apparatus into an output data stream that is compatible with the computing device;
wherein the apparatus and the computing device are each mobile wireless devices, and wherein the apparatus is configured to use the updated first means to directly communicate with the computing device via the wireless interface.

27. The apparatus of claim 26, wherein the first means includes a memory storing data implementing a state machine.

28. A first computing device, comprising:
an external wireless interface;
a processor;
a memory having stored therein:
  a set of application data;
  data implementing a state machine usable to perform at least one of data format and protocol conversion on the set of application data to produce a data stream for transmission via the external interface;
  program instructions executable by the first computing device to:
    update the state machine in response to detecting a second computing device for which the state machine is currently unable to generate a compatible data stream;
    use the updated state machine to generate a data stream compatible with the second computing device; and directly transmit the compatible data stream to the second computing device via the external wireless interface;

wherein the first computing device is a mobile wireless device.

29. A method, comprising:

a first computing device wirelessly receiving a request from a second computing device to dynamically up date the second computing device to permit direct wireless communication with a third computing device, wherein the second computing device is not currently configured to directly exchange application data with the third computing device such that the exchanged application data is usable by application programs on both the second and third computing devices, wherein the second and third computing devices are each mobile wireless devices;

responsive to the request, the first computing device wirelessly providing information to the second computing device, wherein the provided information is usable by the second computing device to dynamically update itself to permit directly wireless communication with the third computing device, wherein the direct wireless communication includes the second and third computing devices exchanging application data such that the exchanged application data is usable by application programs on both the second and third computing devices;

wherein the first, second, and third computing devices are different from one another, and wherein the direct communication is performed without modification of the third computing device.

30. The method of claim 29, wherein the provided information is usable by the second computing device to subsequently communicate directly with the third computing device according to a communication protocol recognized by the third computing device, but not supported by the second computing device prior to the dynamic update of the second computing device.

31. A first computing device, comprising:

a processor; and a memory having stored therein a first set of information executable by the processor to implement a state machine, wherein the state machine is usable by the first computing device to perform at least one of data format and data protocol conversion on incoming or outgoing data of the first computing device, wherein the first set of information is dynamically updatable from a source external to the first computing device in response to detecting a second computing device for which the first computing device is not currently configured to generate a compatible data stream, and wherein, upon the first set of information being dynamically updated, the first computing device is configured to permit a data exchange with the second computing device according to at least one of one or more data formats and data protocols not previously supported by the first computing device, wherein the data exchange is performed wirelessly without the use of an intervening device between the first and second computing devices;

wherein the first and second computing devices are mobile wireless devices.

32. The first computing device of claim 31, wherein the first computing device is a mobile phone, and wherein the data exchange with the second computing device is performed without modifying the second computing device.

33. A method, comprising:

at a first point in time, a first computing device detecting a second computing device, wherein the second computing device is configured to externally transmit or receive information according to one or more communication protocols, and wherein the first computing device is not configured, at the first point in time, to externally transmit or receive data using any of the one or more communication protocols;

in response to said detecting, the first computing device automatically retrieving data from an external source via wireless communication, wherein the retrieved data is usable to facilitate the first computing device generating output data according to at least one of the one or more communication protocols recognized by the second computing device;

the first computing device using the automatically retrieved data to directly communicate with the second computing device wirelessly using at least one of the one or more communication protocols recognized by the second computing device;

wherein the first computing device and the second computing device are each mobile wireless devices; and wherein the second computing device and the external source are different from one another.

34. The method of claim 33, wherein the first computing device is a mobile phone.

* * * * *

UNITED STATES PATENT AND TRADEMARK OFFICE
CERTIFICATE OF CORRECTION

| | | |
|---|---|---|
| PATENT NO. | : 7,668,144 B2 | Page 1 of 1 |
| APPLICATION NO. | : 10/162344 | |
| DATED | : February 23, 2010 | |
| INVENTOR(S) | : Rebecca S. Taylor et al. | |

It is certified that error appears in the above-identified patent and that said Letters Patent is hereby corrected as shown below:

<u>Column 15</u>

Line 8, please delete "dynamically up date" and substitute -- dynamically update --.

Signed and Sealed this

Fourth Day of May, 2010

David J. Kappos
*Director of the United States Patent and Trademark Office*